US00RE50033E

(19) United States
(12) Reissued Patent
Patil et al.

(10) Patent Number: US RE50,033 E
(45) Date of Reissued Patent: Jul. 2, 2024

(54) OPEN EAR AUDIO DEVICE WITH BONE CONDUCTION SPEAKER

(71) Applicant: BOSE CORPORATION, Framingham, MA (US)

(72) Inventors: Naganagouda Patil, Westborough, MA (US); Matthew Christopher Smith, Needham, MA (US); Ilissa Brooke Bruser, Framingham, MA (US); Maya Antara Mukhopadhaya, Brookline, MA (US)

(73) Assignee: BOSE CORPORATION, Framingham, MA (US)

(21) Appl. No.: 16/879,963

(22) Filed: May 21, 2020

Related U.S. Patent Documents

Reissue of:
(64) Patent No.: 10,631,075
Issued: Apr. 21, 2020
Appl. No.: 16/188,246
Filed: Nov. 12, 2018

(51) Int. Cl.
*H04R 1/10* (2006.01)

(52) U.S. Cl.
CPC ..... *H04R 1/1041* (2013.01); *H04R 1/1008* (2013.01); *H04R 1/1091* (2013.01); *H04R 1/1075* (2013.01); *H04R 2420/07* (2013.01); *H04R 2430/01* (2013.01); *H04R 2460/07* (2013.01); *H04R 2460/13* (2013.01)

(58) Field of Classification Search
CPC .. H04R 1/1008; H04R 1/1091; H04R 1/1041; H04R 1/1075; H04R 2430/01; H04R 2460/13; H04R 2460/07; H04R 2420/07
See application file for complete search history.

(56) References Cited

U.S. PATENT DOCUMENTS

| | | | | |
|---|---|---|---|---|
| 6,728,374 | B1 * | 4/2004 | Takeda | H04M 1/03 379/433.02 |
| 8,447,061 | B2 * | 5/2013 | Lee | H04R 1/1091 381/181 |
| 10,142,735 | B2 * | 11/2018 | Jan | H04R 5/0335 |
| 10,728,649 | B1 * | 7/2020 | Holman | H04R 1/1091 |
| 2002/0012441 | A1 * | 1/2002 | Matsunaga | H04R 1/083 381/381 |
| 2009/0292161 | A1 * | 11/2009 | Parker | H04R 25/606 600/25 |

(Continued)

OTHER PUBLICATIONS

International Search Report and Written Opinion for International Application No. PCT/US2019/060969 dated Mar. 23, 2020.

*Primary Examiner* — Eric B. Kiss
(74) *Attorney, Agent, or Firm* — Patterson + Sheridan, LLP

(57) ABSTRACT

Methods and apparatus are provided for an open ear audio device outputting audio using an external audio speaker, bone conduction speaker, or both an external audio speaker and bone conduction speaker. In an aspect, sound is output using either the audio speaker or the bone conduction speaker based on the type of sound. Audio the user desires to keep private are configured to be output using the bone conduction speaker. In an aspect, the audio device simultaneously outputs a first sound using the audio speaker and a second sound using the bone conduction speaker. The user receives both streams of audio and selects which sound to focus on. In an aspect, the audio device determines how to output audio based on the SPL of the user's environment.

16 Claims, 5 Drawing Sheets

(56) References Cited

U.S. PATENT DOCUMENTS

| | | | | |
|---|---|---|---|---|
| 2010/0278362 | A1* | 11/2010 | Kim | H04M 1/03 381/151 |
| 2012/0289162 | A1* | 11/2012 | Hosoi | H04R 25/606 455/41.3 |
| 2013/0051585 | A1* | 2/2013 | Karkkainen | H04R 1/1075 381/151 |
| 2013/0308798 | A1* | 11/2013 | Lee | H04R 9/02 381/151 |
| 2014/0277645 | A1* | 9/2014 | Thirumale | G01C 21/3629 700/94 |
| 2014/0364171 | A1* | 12/2014 | Heiman | H04M 1/605 455/566 |
| 2015/0117688 | A1* | 4/2015 | Kim | H04R 25/00 381/321 |
| 2015/0281944 | A1* | 10/2015 | Satou | H04R 3/12 455/566 |
| 2016/0150323 | A1* | 5/2016 | Yan | H04R 17/00 381/123 |
| 2016/0286299 | A1* | 9/2016 | Anderson | H04R 1/1016 |
| 2017/0223445 | A1* | 8/2017 | Bullen | H04R 1/1041 |
| 2019/0075389 | A1* | 3/2019 | Jan | H04R 1/1041 |

* cited by examiner

OPEN EAR AUDIO DEVICE WITH BONE CONDUCTION SPEAKER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

Aspects of the disclosure generally relate to methods for operation of an open ear audio device including a bone conduction speaker.

BACKGROUND

Earbuds and over-the-hear headsets may inhibit a user from hearing sounds in the user's surroundings and may send a social cue that the user is unavailable for interaction with others. Open ear audio devices allow a user to more easily hear noise in the user's vicinity and provide an indication the user is available for interaction while allowing the user to listen to audio output. Improvements in open ear audio device features, performance, and form factors are desirable.

SUMMARY

All examples and features mentioned herein can be combined in any technically possible manner.

Aspects provide methods and apparatus for selectively outputting audio through an audio speaker, a bone conduction speaker, or both the audio speaker and the bone conduction speaker. According to aspects, a user configures the types of sounds to be output using the audio speaker and the types of sounds to be output using the bone conduction speaker. In an example, the user may select certain sounds to be output using the bone conduction speaker to increase the user's privacy. According to aspects, the audio speaker and the bone conduction speaker simultaneously output different sounds. Because the audio device outputs both sounds, the user selects which sound to focus on. According to aspects, the audio speaker and the bone conduction speaker output the same sounds. According to aspects, the audio device outputs sound using the audio speaker, determines the noise in the user's environment exceeds a configurable threshold value, and outputs sound using only the bone conduction speaker. The use of both an audio speaker and a bone conduction speaker in the wearable open ear audio device provides options for private mode listening by open ear audio devices.

Certain aspects provide a wearable acoustic device comprising an external speaker, a bone conduction transducer, and at least one processor. The at least one processor is coupled to the external speaker and the bone conduction transducer and is configured to detect a sound to be output by the acoustic device, determine based on the sound whether to operate in a first mode or a second mode, wherein in the first mode the sound is output by the acoustic device via the external speaker, and in the second mode the sound is output by the acoustic device via the bone conduction transducer, and output the sound via based on the determination.

In an aspect, the bone conduction transducer contacts a temple region of a user wearing the acoustic device. In an aspect, the bone conduction transducer contacts an area behind an ear of a user wearing the acoustic device. In an aspect, the bone conduction transducer contacts skin covering the skull of a user wearing the acoustic device.

In an aspect, the sound comprises a voice phone call and the at least one processor is configured to determine to operate in the second mode, wherein the voice phone call is output by the bone conduction transducer and is not output by the external speaker.

In an aspect, the sound comprises informational audio and the at least one processor is configured to determine to operate in the second mode, wherein the informational audio is output by the bone conduction transducer and is not output by the external speaker.

In an aspect, the sound comprises music output and the at least one processor is configured to determine to operate in the first mode, wherein the music is output by the external speaker and is not output by the bone conduction transducer.

In an aspect, a user of the wearable acoustic device configures sound inputs associated with operating in the first mode and sound inputs associated with operating in the second mode.

Certain aspects provide a wearable acoustic device comprising an external speaker, a bone conduction transducer, and at least one processor coupled to the external speaker and the bone conduction transducer. The at least one processor is configured to output audio via the external speaker, receive an audio input relating to a point of interest in a vicinity of a user wearing the acoustic device, and simultaneously output the audio via the external speaker and the audio input via the bone conduction transducer.

In an aspect, the audio output via the external speaker comprises music and the audio input relating to a point of interest comprises directions guiding a user of the wearable acoustic device to a physical location.

In an aspect, the bone conduction transducer contacts skin of a user wearing the acoustic device.

In an aspect, the wearable acoustic device comprises one of around-the-ear headphones, around-the-neck headphones, acoustic eyeglasses, or a protective hard hat.

Certain aspects provide a wearable acoustic device comprising an external speaker, a bone conduction transducer, a microphone, and at least one processor coupled to the external speaker, the bone conduction transducer, and the microphone. The at least one processor is configured to output audio via at least the external speaker, detect, via the microphone, a sound pressure level (SPL) of an external sound exceeds a configurable SPL threshold amount, in response to the detected SPL of the external sound exceeding the configurable SPL threshold amount, output the audio via the bone conduction transducer.

In an aspect, in response to the detected SPL of the external sound exceeding the configurable SPL threshold amount, the at least one processor is further configured to cause the external speaker to enter a power-saving state.

In an aspect, the at least one processor is further configured to: prior to the detecting, output the audio signal via the bone conduction transducer and in response to the detected SPL of the external sound exceeding the configurable SPL threshold amount, increase an intensity of the audio signal output by the bone conduction transducer to be greater than the SPL of the external sound by a configurable amount.

In an aspect, in response to the detected SPL of the external sound exceeding the configurable SPL threshold amount, the at least one processor is configured to stop outputting the audio via the external speaker.

In an aspect, in response to the detected SPL of the external sound exceeding the configurable SPL threshold amount, the at least one processor is configured to output via the external speaker and the bone conduction transducer a warning message to alert a user of the wearable acoustic device.

In an aspect, the at least one processor is configured to detect, via the microphone, a second SPL of the external sound is less than or equal to the configurable SPL threshold amount and in response to the second SPL, output the audio signal via the external speaker. In an aspect, in response to the second SPL, the at least one processor is further configured to stop outputting the audio via the bone conduction transducer.

In an aspect, the wearable acoustic device comprises a protective hard hat.

DETAILED DESCRIPTION

Figure 1A:
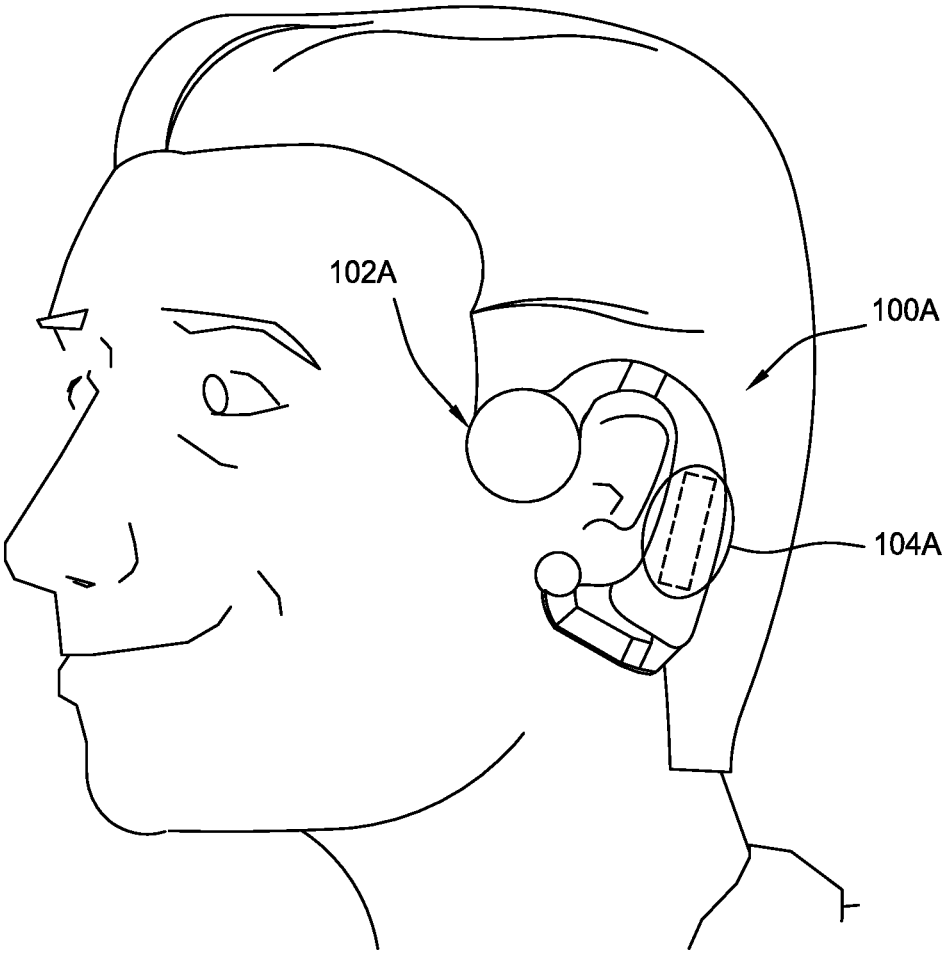
FIGS. 1A-1C illustrate example form factors of wearable open ear audio devices, in accordance with certain aspects of the present disclosure.

Wearable open ear audio devices do not physically obstruct a path between a user's ear canal and the outside world. In some examples, wearable audio devices are referred to as off ear headphones, open audio devices, or out loud acoustic devices. Open ear audio devices are configured to be worn on or abutting an ear of a user, on a user's head, over the shoulders of the user, or otherwise on the user's body.

Open ear audio devices allow a user to hear both sounds from the user's environment in addition to the audio output from the audio device. In some examples, the speaker outputting the sound may be positioned very close to or against the user's skin and very close to the user's ear. Despite the speaker directing audio output towards the user's ear, people nearby the user may hear the audio. Depending on the environment and the volume of the audio, others may hear leakage from the audio or hear the audio with relative clarity. In certain environments or based on the type of audio, a user may want to minimize the chance of others hearing the audio.

Aspects of the present disclosure provide an audio device including an audio speaker and a bone conduction speaker. In an example, the audio device is configured to transition between outputting audio from an external audio speaker and a bone conduction speaker. Selectively outputting audio through the bone conduction speaker provides the user with a single device that has the benefit of an open ear form factor while offering the user increased privacy.

In an example, the audio device is configured to selectively output audio through one of the audio speaker or the bone conduction speaker based on the detected environmental noise. In certain scenarios such as very loud work environments, a user may need to, at least intermittently, wear hearing protection such as earplugs. An open ear form factor allows the user to easily wear both protective earplugs and an audio device. A user wearing earplugs may not hear output from the audio speaker but can hear audio output from the bone conduction speaker. Selectively outputting audio through the bone conduction speaker when the detected environment noise exceeds a threshold allows a user to hear audio using an open ear device, despite very loud surroundings and/or the user's use of hearing protection.

Audio AR technology adds an audible layer of information and experiences based on what a user is looking at to enhance the user's audio experience. For example, an audio AR platform may enhance a user's travel experience by simulating historic events at landmarks as the user views them, streaming a renowned speech of a famous person as the user is looking a monument of the famous person, or providing information on which way to turn while traveling to a desired destination. In an example, the audio device is configured to simultaneously output audio through the audio speaker and output audio AR through the bone conduction speaker. Simultaneously outputting both streams of audio provides the user with a choice of which audio on which to focus.

Figure 1B:
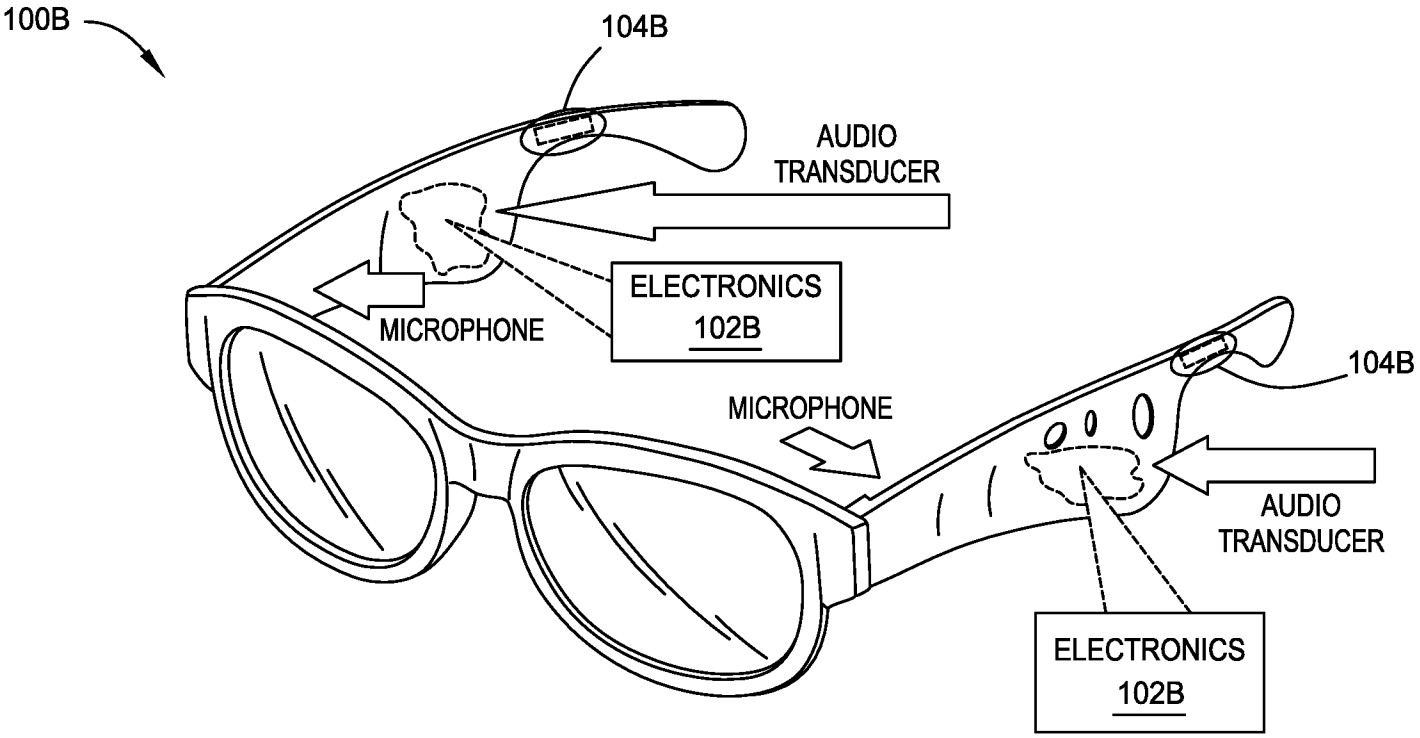
Figure 1C:
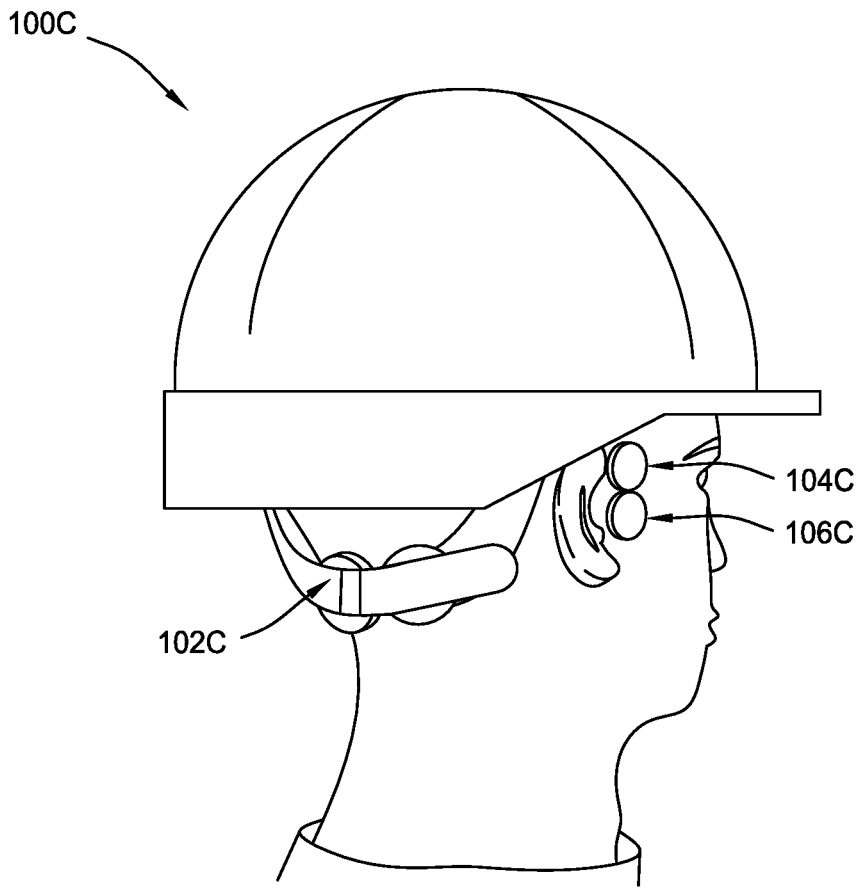

FIGS. 1A-1C illustrate example form factors of an open ear audio device including an external audio speaker and a bone conduction speaker, in accordance with aspects of the present disclosure. Example open ear audio devices described herein reference an over the ear hook, eyeglasses, and a protective hard hat; however, aspects of the disclosure are not limited to these examples. Operation of an open ear audio device including a bone conduction speaker as described herein are not specific to a form factor of the audio device. Instead, any open ear audio device including a bone condition speaker may perform the described operations.

Specific implementations of open ear audio devices serving the purpose of outputting audio using a bone conduction speaker, audio speaker, or combination thereof are presented with some degree of detail. Such presentations of specific implementations are intended to facilitate understanding through provision of examples and should not be taken as limiting either the scope of disclosure or the scope of claim coverage. Further, aspects refer to an audio speaker and a bone conduction speaker; however, the audio speaker or bone conduction speaker may include an array of audio speakers or an array of bone conduction speakers, respectively.

FIG. 1A illustrates an around-the-ear hook form factor 100A of an audio device. The around-the-ear hook holds the audio speaker near an ear of a user. In the example 100A, the external audio speaker is housed in the area 102A. The audio device includes a bone conduction speaker in contact with the user's skin. In some examples, the bone conduction speaker is behind the user's ear, close to the user's ear, proximate the user's temple region, or contacting skin covering a portion of the user's skull when the audio device is positioned on the user's body. In one example, the bone conduction speaker is housed in the region 104A. Using an around-the-ear hook as described in PCT Patent App. No. PCT/US18/51450, titled "Audio Device", filed on Sep. 18, 2018, which is hereby incorporated by reference in its entirety, may facilitate placement of the bone conduction speaker at a location where the around-the-ear hook is more likely to contact the skin of a user when the around-the-ear hook is being worn.

FIG. 1B illustrates an audio eyeglass form factor 100B of an audio device. External audio speakers are housed within the frame of the audio eyeglasses. In an example, electronics including the audio speaker are housed in the area 102B. The audio eyeglasses include a bone conduction speaker in contact with the user's skin. In an example, the bone conduction speaker is located proximate a temple region of the user and above an ear of a user. In an example, the audio eyeglasses 100B include a bone conduction speaker above each ear of the user, behind the user's ear, proximate the user's temple region, or contacting skin covering a portion of the user's skull. In one example, the bone conduction speaker is housed in the region 104B.

FIG. 1C illustrates a protective hard hat, form factor 100C of an audio device. A protective hard hat may be known as a safety helmet. External audio speakers are housed at least partially within the hard hat or coupled to the hard hat. The hard hat includes one or more bone conduction speakers in contact with the user's skin. In an example, the audio speakers are mounted forward of the user's fossa as illustrated at 104C and the bone conduction speakers are mounted forward of the user's tragus as illustrated at 106C. In alternative examples, a bone conduction speaker is mounted at least partially within a band 102C that spans across part of the back side of the user's head. In some examples, the band is an adjustable band configured to keep the hard hat in place and properly positioned on the user's head. The band contacts skin above the user's skull. In an example, the bone conduction speaker includes an array of bone conducting speakers around one or more contact points of the suspension of the hard hat. In an example, the bone conduction speaker is located around the ear of the user, above each ear of the user, behind the user's ear, proximate the user's temple region, or contacting skin covering a portion of the user's skull.

The examples in FIGS. 1A-1C are non-limiting; other form factors of a wearable open audio device are contemplated, including head, shoulder, or body-worn acoustic devices that include one or more acoustic speakers and bone conduction speakers to produce sound without physically obstructing a path between a user's ear canal and the outside world.

Regardless of form factor, the open ear audio device may include a memory and processor, communication unit, transceiver, microphone, audio output transducer or audio speaker, and bone conduction transducer or bone conduction speaker. The memory may include Read Only Memory (ROM), a Random Access Memory (RAM), and/or a flash ROM. The memory stores program code for controlling the memory and processor. The memory and processor control the operations of the open ear audio device.

The processor controls the general operation of the open ear audio device. For example, the processor performs process and control for audio and/or data communication. In addition to the general operation, the processor is configured to selectively output audio through the audio speaker, the bone conduction speaker, or both the audio speaker and the bone conduction speaker. In an aspect, the processor is configured to switch between audio output and bone conduction output based on the detected noise in the environment. In an aspect, the audio device is configured to simultaneously output audio through the audio speaker and output AR informational output through the bone conduction speaker. While audio AR information is given as one example of audio that could be output through the bone conduction speaker, the bone conduction speaker could be used to output other audio as well, including any type of audio the user wishes to be delivered privately, such as phone calls, messages, calendar reminders, etc.

The communication unit facilitates a wireless connection with one or more other wireless devices. In an example, the communication unit may include one or more wireless protocol engines such as a Bluetooth engine. While Bluetooth is used as an example protocol, other communication protocols may also be used. Some examples include Bluetooth Low Energy (BLE), Near Field Communications (NFC), IEEE 802.11, or other local area network (LAN) or personal area network (PAN) protocols. In an example, a communication unit facilitates receiving information from an AR application on a user's cell phone or other personal wireless device. The AR application includes Global Positioning System (GPS) capability and may determine a position of the personal device and thus the user wearing the open ear audio device based on GPS coordinates. The GPS capability could also or alternatively be included in the audio device.

The transceiver transmits and receives information via one or more antennae to exchange information with one or more other wireless devices.

The audio output transducer may also be known as an audio driver or external audio speaker. In some examples, more than one audio output speaker is used. The audio speaker converts electrical signals into sound. The audio device may also include one or more microphones, which detect sound in the external environment, and convert the detected sound into electrical signals.

The bone conduction transducer may also be known as a bone conduction driver or bone conduction speaker. In some examples, more than one bone conduction speaker is used. The bone conduction speaker decodes sound waves and converts the sound waves into vibrations. The vibrations are received by the inner ear such that the sound waves reach the user's ears as vibrations through bones and skin.

Optionally, the audio device includes one or more microphones configured to detect the ambient noise in the vicinity of the audio device. In an example, the microphone(s) may be placed in an acoustic null of the audio speaker output, which enhances acoustic isolation of the audio speaker output from the microphone. This helps to ensure the microphone(s) is measuring the sounds of the user's environment and not the output by the audio speakers. Accordingly, the microphone(s) is able to determine the amount of ambient noise without an echo canceller while the audio speakers are outputting audio.

Personal audio devices such as wearable open ear audio devices are increasingly used as users engage in a variety of activities. In an example, a user wears open ear audio devices as he gets ready in the privacy of his home, commutes to work using mass transit, works in a communal space, and exercises outside. The user appreciates hearing sounds from his environment and appearing to be more available for social interaction while listening to audio output; however, there may be time in which the user desires private audio output. Instead of switching between the open ear audio device and a device that allows a more private listening experience, the open ear audio devices described herein allows the user to switch audio output from the audio speaker to a bone conduction speaker.

The audio device is configured to operate in multiple modes and switch between modes based on the sound to be output. In a first mode, the audio device outputs audio through the audio speaker. In a second mode, the audio device outputs sound through the bone conduction speaker. In some examples, in the first mode, the audio is output using both the audio speaker and the bone conduction speakers. In the second mode, the sound is output only using the bone conduction speakers and not using the audio speakers. The first mode may be referred to a public mode, as sound is output using external, audio speakers. The second mode may be referred to a private listening mode as audio is not output using external audio speakers and is less likely to be heard by people around the user. In an aspect, based on the selected mode, the audio device is configured to automatically route certain types of sound through the audio speakers and route other types of sound through the bone conduction speakers. The sounds output using the audio speakers and the sounds output using the bone conduction speakers can be preconfigured or set based on user selection.

Through user selection, for example, using an application on the user's personal wireless device, the user configures types of audio to be output through audio speakers and types of audio to be output through bone conduction speakers. In an aspect, the user configures types of audio to be output through audio speakers and types of audio to be output through bone conduction speakers using features on the audio device or using voice commands with one of the audio device or the user's personal device.

Types of audio include any audio output by the audio device. For example, types of audio include a voice phone call, music, podcasts, application alerts, alarms, output from a user's virtual personal assistant, and informational audio. Informational audio includes output from AR applications on the user's personal device such as a map application or travel application providing informational output about the user's vicinity such as directions or a point of interest around the user or information about the user's surroundings.

In an example, the user configures music, podcasts, and informational audio to be output in a first mode using the audio speakers. In an example, the user configures voice from a phone call to be output using a second mode. In the second mode, sound is output using a bone conduction speaker. People in the vicinity of the user are less likely to hear both sides of a phone call when an incoming call is received by the user using a bone conduction speaker as compared to the audio speaker of the open ear device. Routing audio from a phone call through the bone conduction speaker increases the user's privacy. In an example, the user may want directions to a desired location such as a departure gate in a busy airport to be kept private. Accordingly, the user configures informational audio to be output using the second mode. The audio device could alternatively be preconfigured to automatically route certain types of sound through the audio speakers and automatically route other types of sound through the bone conduction speakers, without any user interaction.

In an example, the first mode is the default mode of operation for the open ear audio device. If the user does not configure a type of sound to be output using the bone conduction speaker, the sound will be output using the external audio speaker. Because a user's preference for audio output may change based on the environment, the user is able to reconfigure preferences. In an example, at home, the user configures all audio to be output using the audio speakers. While commuting and at work, the user configures streaming music, phone calls, voicemail alerts, text message notifications, and messages from a home security system to be output using the bone conduction speaker. In an example, other types of sound, by default, may be configured to be output using the audio speakers. When walking a dog in the park, the user configures music and AR output to be output using the audio speakers and the user configures other types of audio to be output using the bone conduction speakers.

In some examples, the user may create and save one or more preferences. A first saved preference may be referred to as "home" in which all audio is selected to be output using the audio speakers. A second saved preference may be referred to as "work" in which streaming music, phone calls, voicemail alerts, text message notifications, and messages from a home security system are selected to be output using the bone conduction speaker. Using the audio device or an application on the user's personal wireless device, the user may toggle through configurable saved preferences throughout the day to easily route audio based on the user's preferences.

According to aspects, a user is wearing the open ear audio device while an AR application running on the user's personal wireless device (e.g., smart phone) detects proximity of the user to a point of interest. The point of interest may be a place near the user with an associated virtual audio marker. The audio marker may be defined by GPS coordinates. In an aspect, the audio AR application may store GPS locations of preconfigured points of interest. The AR application may continuously track the user's position relative to the audio markers and may determine that the user is in the vicinity of a particular audio marker when the user moves closer to the position of the audio marker. In response to the detected proximity, the audio device may output pre-recorded digital information or other audio associated with the point of interest.

According to aspects, an open ear audio device, which may be in communication with a user's personal wireless device, outputs audio using an external audio speaker or a bone conduction speaker. The audio device receives an indication or detects that the user is close to a point of interest. The audio device receives audio input associated with the point of interest in the user's vicinity. Instead of pausing the audio or having the user select to receive one of the audio or the audio input associated with the point of interest, the audio device outputs both streams of audio. In an example, the audio device continues to output the audio using the external speaker while outputting the audio associated with the point of interest using the bone conduction speaker. The user decides which audio stream to focus on.

In one example, the audio device outputs music using the external speaker. The audio input relating to a point of interest includes directions guiding the user to a physical location or historical information associated with a nearby place. The audio device continues to output the music using the external audio speaker and outputs the audio input relating to the point of interest using the bone conduction speaker. In some examples, the audio device may reduce the volume of the music output via the external audio speaker so the user can focus on the audio being output from the bone conduction speaker. In some examples, the audio platform and the bone conduction platform have different frequency response curves. A first range of frequency bands is output using the bone conduction speaker while a second range of frequency bands is simultaneously output using the external audio speaker. In some examples, processing logic is performed to send frequencies to the respective driver that will represent the audio to the user. In an example, a microphone detects sound in the user's environment and the detected sound is used by the processing logic to determine which frequencies to send to each driver so that the audio output to the user matches the intended audio.

Noise-induced hearing loss can be caused by short-term exposures to noise or prolonged exposure to high noise levels over a period of time. Hearing conservation programs are designed to protect workers with significant occupational noise exposures from hearing impairment, regardless of how long an individual worker is subject to such noise exposures. In an effort to protect hearing, employees are required to wear hearing protection if they are exposed to noise at or above a threshold decibel (dB) amount over a certain number of hours. For example, an individual exposed to 85 dB over 8 working hours or an 8-hour time-weighted average should wear hearing protection to protect hearing and decrease the chance of noise-induced hearing loss. Types of hearing protection include premolded or moldable ear plugs inserted in the ear canal and sound attenuating ear pieces that fit around the user's ear.

Construction sites and manufacturing facilities are examples of environments in which people wear hearing protection to protect against exposure to high noise levels. The high level of noise may be intermittent or continuous. Open ear audio devices in these and other loud environments facilitate communication between employees while allowing individuals to be aware of their surroundings. In an example, employees communicate safety information about the working environment using the open ear audio device. When the user's environment is intermittently loud, the user may selectively wear hearing protection. The open ear form factor allows the user to use the audio device and conveniently insert and remove hearing protection while receiving audio, including communication from coworkers.

Figure 2:
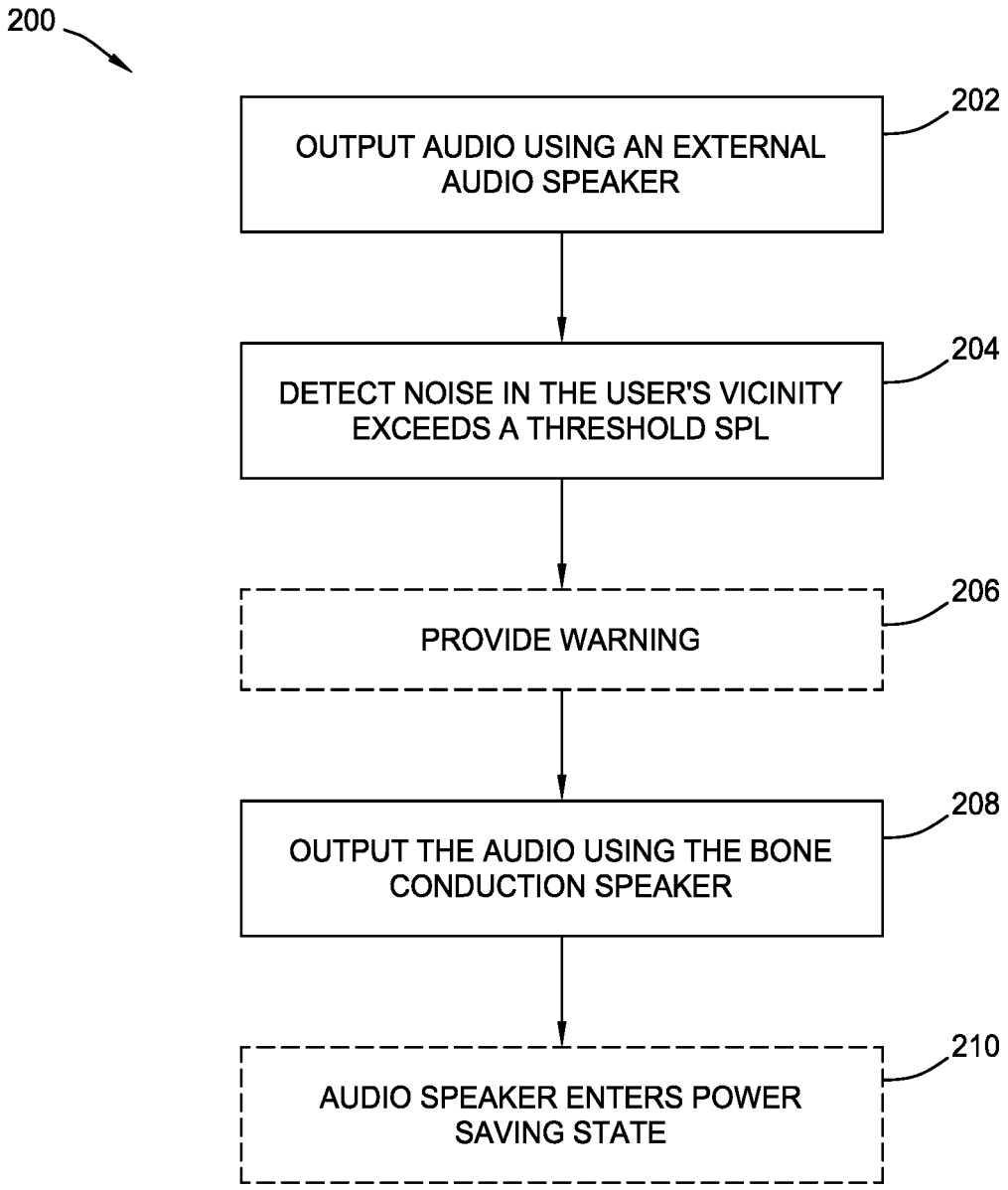
FIG. 2 illustrates example operations performed by an open ear audio device including an external audio speaker and a bone conduction speaker.
Figure 3:
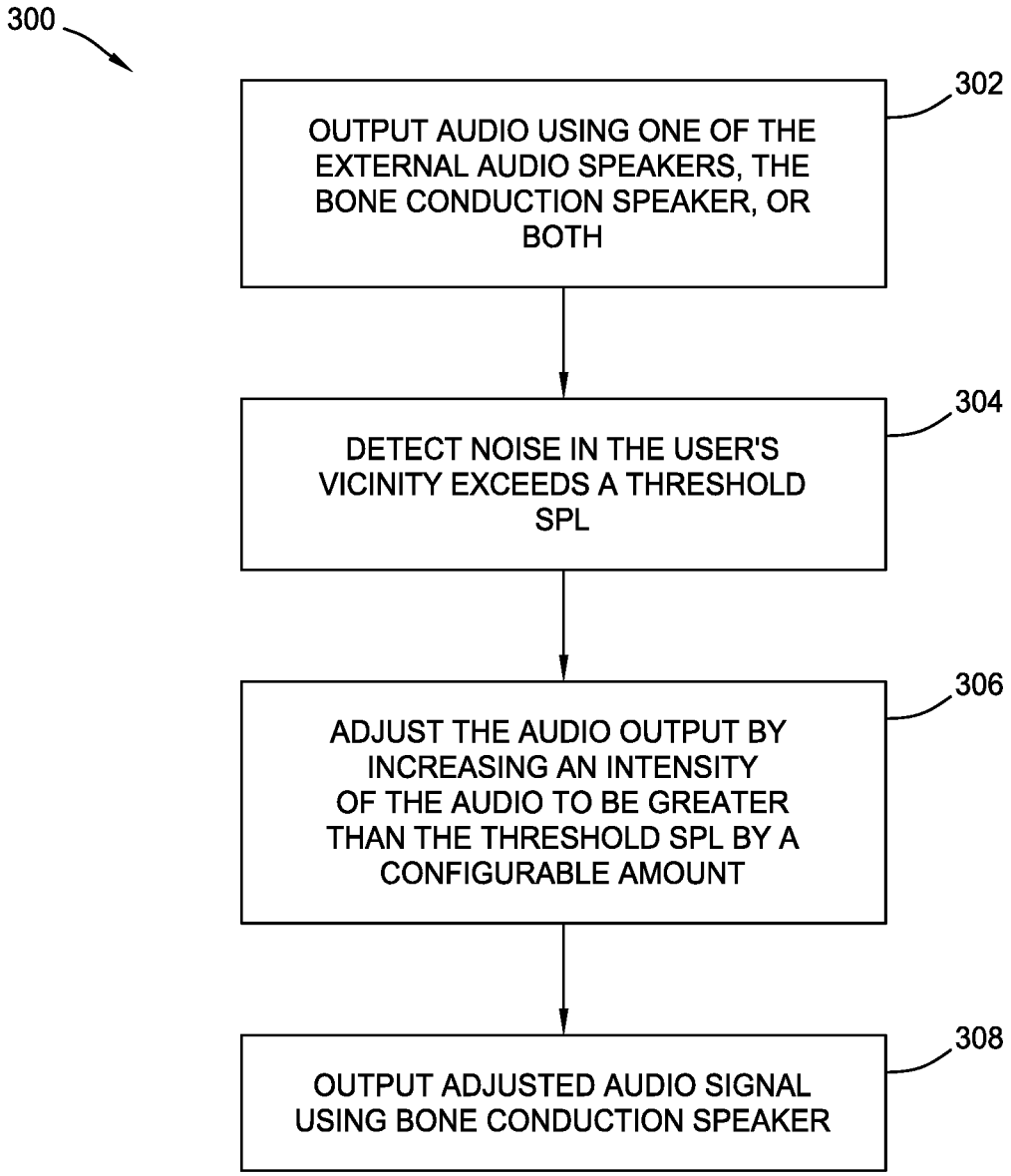
FIG. 3 illustrates example operations performed by an open ear audio device including an external acoustic speaker and a bone conduction speaker.

FIGS. 2-3 illustrate example operations 200, 300 performed by an open ear audio device in accordance with aspects of the present disclosure. The open ear audio device includes one or more microphones to measure noise in the vicinity of the user. In an example, the open ear audio device is configured as a type of personal protective equipment such as a hard hat or safety glasses.

At 202, the audio device outputs audio using an external audio speaker. At 204, the audio device detects the noise in the user's vicinity exceeds a threshold SPL. In an example, the threshold SPL is related to a noise level at which a user should wear hearing protection to avoid exposure to high noise levels. In an example, the threshold is less than 85 dB. The user may not be able to hear audio output using the audio speaker because of the environmental noise and because the user should be wearing hearing protection. Optionally, at 206, the audio device outputs a warning message informing the user of the high environmental noise and encourages the user to use hearing protection. In an example, the warning message is output using both the audio speaker and the bone conduction speaker. At 208, the audio device outputs the audio using the bone conduction speaker. In an aspect, the audio device discontinues outputting the audio using the audio speakers. Optionally, at 210, in response to the detected SPL exceeding a threshold value, the audio speaker enters a power saving state.

When the audio device detects the external sound is less than the threshold SPL amount, the audio device continues to output the audio using the bone conduction speaker and outputs the audio using the audio speaker. In another example, when the detected external sound has decreased to be less than the threshold SPL amount, the audio device stops outputting the audio using the bone conduction speaker and only outputs audio using the external audio speakers.

In an effort to ensure that the user is able to hear the audio output by the wearable device, the audio output is adjusted to have an intensity that is a threshold amount greater than the detected environmental SPL. In an example, the intensity refers to the user's perception of loudness of the audio signal as opposed to an actual SPL measurement of the audio output. At 302, the audio device outputs audio using one of the external audio speaker, the bone conduction speaker, or both the audio speaker and the bone conduction speaker. At 304, the audio device detects the noise in the user's vicinity exceeds a threshold SPL. The threshold SPL can be the same as the threshold SPL described in reference to FIG. 2 or a different threshold. In response, at 306, the audio device adjusts the intensity of the audio output. In an example, the audio device increases the intensity by increasing the perception of loudness of the audio to be greater than the threshold SPL by a configurable amount. At 308, the bone conduction speaker outputs the adjusted audio signal. In an example, only the bone conduction speaker outputs the adjusted audio signal because the user should be wearing hearing protection.

As described herein, an open ear audio selectively outputs audio in a private mode using a bone conduction speaker or in a public mode using an audio speaker. Absent the techniques described herein, a user of an open ear audio device is not able to privately receive audio using only the open ear audio device. Instead, the user may need to switch to an in-ear audio device when additional privacy is desired.

In an aspect, the audio device simultaneously outputs audio using an external audio speaker while outputting informational AR audio (or other types of audio) using a bone conduction speaker. The user does not experience a pause of the audio output and the user determines which information to focus on.

In an aspect, the audio device determines whether to output sound using the external audio speaker, bone conduction speaker, or both based on the detected environmental noise. This may be especially helpful in very loud environments because the open ear audio device allows the user to hear information even while wearing hearing protection.

In the preceding, reference is made to aspects presented in this disclosure. However, the scope of the present disclosure is not limited to specific described aspects. Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). In some implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A wearable acoustic device comprising:

an external speaker;

a bone conduction transducer; and at least one processor coupled to the external speaker and the bone conduction transducer configured to:

detect a sound to be output by the acoustic device;

determine based on a type *or level* of the sound whether to operate in a first public mode or a second private mode, wherein in the first public mode the sound is output by the acoustic device via the external speaker, and in the second private mode the sound is output by the acoustic device via the bone conduction transducer, wherein:

a user of the wearable acoustic device configures sound to be output in the first public mode or the second private mode based, at least, in part, on the type of the sound,

*the sound is output in the second private mode when a sound pressure level (SPL) of an external sound exceeds a configurable SPL threshold amount,* and the type of the sound comprises any combination of: a voice phone call from a user's personal device, music, podcast, alert from an application running on the user's personal device, alarm, output from a virtual personal assistant, and informational audio; and output the sound via based on the determination.

2. The wearable acoustic device of claim 1, wherein the bone conduction transducer contacts a temple region of the user wearing the acoustic device.

3. The wearable acoustic device of claim 1, wherein the bone conduction transducer contacts an area behind an ear of the user wearing the acoustic device.

4. The wearable acoustic device of claim 1, wherein the bone conduction transducer contacts skin covering the skull of the user wearing the acoustic device.

5. The wearable acoustic device of claim 1, wherein:

the sound comprises the voice phone call; and the at least one processor is configured to determine to operate in the second private mode, wherein the voice phone call is output by the bone conduction transducer and is not output by the external speaker.

6. The wearable acoustic device of claim 1, wherein:

the sound comprises informational audio; and the at least one processor is configured to determine to operate in the second private mode, wherein the informational audio is output by the bone conduction transducer and is not output by the external speaker.

7. The wearable acoustic device of claim 1, wherein:

the sound comprises music output; and the at least one processor is configured to determine to operate in the first public mode, wherein the music is output by the external speaker and is not output by the bone conduction transducer.

8. The wearable acoustic device of claim 1, wherein the sound is further configured to be output in the first public mode or the second private mode based on the user's environment.

[9. A wearable acoustic device comprising:

an external speaker;

a bone conduction transducer; and at least one processor coupled to the external speaker and the bone conduction transducer configured to:

output audio via the external speaker;

receive an audio input relating to a point of interest in a vicinity of a user wearing the acoustic device; and simultaneously output the audio via the external speaker and the audio input via the bone conduction transducer.]

[10. The wearable acoustic device of claim 9, wherein:

the audio output via the external speaker comprises music; and the audio input relating to a point of interest comprises directions guiding a user of the wearable acoustic device to a physical location.]

[11. The wearable acoustic device of claim 10, wherein the wearable acoustic device comprises one of: around-the-ear headphones, around-the-neck headphones, acoustic eyeglasses, or a protective hard hat.]

[12. The wearable acoustic device of claim 9, wherein the bone conduction transducer contacts skin of a user wearing the acoustic device.]

13. A wearable acoustic device comprising:

an external speaker;

a bone conduction transducer;

a microphone; and at least one processor coupled to the external speaker and the bone conduction transducer, the at least one processor configured to:

output audio via the external speaker and the bone conduction transducer;

detect, via the microphone, a sound pressure level (SPL) of an external sound exceeds a configurable SPL threshold amount;

in response to the detected SPL of the external sound exceeding the configurable SPL threshold amount, output the audio via the bone conduction transducer, wherein outputting the audio via the bone conduction transducer comprises increasing an intensity of the audio signal output by the bone conduction transducer to be greater than the SPL of the external sound by a configurable amount.

14. The wearable acoustic device of claim 13, wherein in response to the detected SPL of the external sound exceeding the configurable SPL threshold amount, the at least one processor is further configured to:

cause the external speaker to enter a power-saving state.

15. The wearable acoustic device of claim 13, wherein in response to the detected SPL of the external sound exceeding the configurable SPL threshold amount, the at least one processor is further configured to:

stop outputting the audio via the external speaker.

16. The wearable acoustic device of claim 13, wherein in response to the detected SPL of the external sound exceeding the configurable SPL threshold amount, the at least one processor is configured to:

output via the external speaker and the bone conduction transducer a warning message to alert a user of the wearable acoustic device.

17. The wearable acoustic device of claim 13, wherein the at least one processor is configured to:

detect, via the microphone, a second SPL of the external sound is less than or equal to the configurable SPL threshold amount; and in response to the second SPL, output the audio signal via the external speaker.

18. The wearable acoustic device of claim 17, wherein in response to the second SPL, the at least one processor is further configured to:

stop outputting the audio via the bone conduction transducer.

19. The wearable acoustic device of claim 13, wherein the wearable acoustic device comprises a protective hard hat.

*20. The wearable acoustic device of claim 13, wherein the bone conduction transducer contacts skin of a user wearing the wearable acoustic device.*

* * * * *